US011362346B2

(12) United States Patent
Horiuchi et al.

(10) Patent No.: US 11,362,346 B2
(45) Date of Patent: Jun. 14, 2022

(54) FUEL CELL SYSTEM

(71) Applicant: HONDA MOTOR CO., LTD., Tokyo (JP)

(72) Inventors: Yuhei Horiuchi, Wako (JP); Koichi Kimura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 205 days.

(21) Appl. No.: 16/543,733

(22) Filed: Aug. 19, 2019

(65) Prior Publication Data

US 2020/0067111 A1    Feb. 27, 2020

(30) Foreign Application Priority Data

Aug. 23, 2018 (JP) .............................. JP2018-155932

(51) Int. Cl.
| | | |
|---|---|---|
| *H01M 8/04089* | (2016.01) | |
| *H01M 8/04014* | (2016.01) | |
| *H01M 8/0662* | (2016.01) | |
| *H01M 8/08* | (2016.01) | |

(52) U.S. Cl.
CPC ... *H01M 8/04089* (2013.01); *H01M 8/04014* (2013.01); *H01M 8/0662* (2013.01); *H01M 8/08* (2013.01)

(58) Field of Classification Search
None
See application file for complete search history.

(56) References Cited

U.S. PATENT DOCUMENTS

| | | | |
|---|---|---|---|
| 2006/0147774 A1 | 7/2006 | Suzuki et al. | |
| 2013/0209902 A1* | 8/2013 | Mazzotta | H01M 8/04097 429/410 |
| 2018/0301722 A1* | 10/2018 | Kozuka | H01M 8/04835 |
| 2020/0067110 A1* | 2/2020 | Horiuchi | H01M 8/08 |

FOREIGN PATENT DOCUMENTS

| | | |
|---|---|---|
| JP | 2006-147484 | 6/2006 |
| JP | 2012-099394 | 5/2012 |

OTHER PUBLICATIONS

Japanese Office Action for Japanese Patent Application No. 2018-155932 dated Nov. 24, 2021.

* cited by examiner

*Primary Examiner* — Brian R Ohara
*Assistant Examiner* — Patrick Marshall Greene
(74) *Attorney, Agent, or Firm* — Amin, Turocy & Watson, LLP

(57) ABSTRACT

A fuel cell system includes a fuel exhaust gas inlet channel for guiding a fuel exhaust gas containing liquid water discharged from a fuel cell stack to a gas liquid separator provided downstream of a humidifier in an oxygen-containing gas inlet channel. The specific gravity of the fuel exhaust gas is lighter than the specific gravity of the oxygen-containing exhaust gas. An outlet channel of the gas liquid separator includes a stirring booster having a first point and a second point positioned downstream of the first point. The second point is positioned ahead of the first point in the gravity direction.

10 Claims, 7 Drawing Sheets

→ OXYGEN-CONTAINING GAS
---→ FUEL EXHAUST GAS

FUEL CELL SYSTEM

CROSS-REFERENCE TO RELATED APPLICATION

This application is based upon and claims the benefit of priority from Japanese Patent Application No. 2018-155932 filed on Aug. 23, 2018, the contents of which are incorporated herein by reference.

BACKGROUND OF THE INVENTION

Field of the Invention

The present invention relates to a fuel cell system including a fuel cell for generating electricity by electrochemical reactions of a fuel gas and an oxygen-containing gas.

Description of the Related Art

The fuel cell of this type includes an electrolyte membrane. The electrolyte membrane is a polymer ion exchange membrane of fluorocarbon resin, etc. In the state where the electrolyte membrane contains water, the electrolyte membrane functions as a proton ion conductive electrolyte membrane. In the state where the electrolyte membrane is dried, the proton ion conductivity is decreased, and the output of the fuel cell is decreased undesirably.

In an attempt to address the problem, for example, according to the structure disclosed in Japanese Laid-Open Patent Publication No. 2006-147484, a humidifier for humidifying an oxygen-containing gas is provided in an oxygen-containing gas inlet channel, and a gas liquid separator is provided at an outlet of the humidifier so as to maintain the suitable moisture in the electrolyte membrane.

SUMMARY OF THE INVENTION

In the fuel cell system, at the time of starting operation of the fuel cell system at low temperature, a fuel exhaust gas discharged from a fuel cell flows into an oxygen-containing gas inlet channel, and heat is produced in reaction induced by a cathode catalyst to warm up the fuel cell. Further, at the time of ventilating a fuel gas supply unit, a fuel gas is supplied into an oxygen-containing gas inlet channel to induce chemical reaction at a cathode catalyst to suppress the fuel gas concentration in the exhaust gas (hydrogen concentration in the exhaust gas).

However, when a fuel exhaust gas containing liquid water is mixed with an oxygen-containing gas, and supplied to a fuel cell, excessive liquid water may flow into the fuel cell. Further, in the case where the fuel exhaust gas and the oxygen-containing gas are not mixed uniformly, the efficiency of the reaction which produces heat at the cathode catalyst is decreased, and it may not be possible to warm up the fuel cell rapidly.

The present invention has been made taking such problems into account, and an object of the present invention is to provide a fuel cell system in which it is possible to suppress entry of excessive liquid water from an oxygen-containing gas inlet channel into a fuel cell, warm up the fuel cell rapidly, and suppress the fuel gas concentration in an exhaust gas.

According to an aspect of the present invention, a fuel cell system is provided. The fuel cell system includes a fuel cell configured to generate electricity by an electrochemical reaction of a fuel gas and an oxygen-containing gas, an oxygen-containing gas inlet channel configured to supply the oxygen-containing gas to the fuel cell, a humidifier provided in the oxygen-containing gas inlet channel, a gas liquid separator provided downstream of the humidifier in the oxygen-containing gas inlet channel, and a fuel exhaust gas inlet channel configured to guide a fuel exhaust gas containing liquid water discharged from the fuel cell to the gas liquid separator, wherein the gas liquid separator includes a separator body configured to perform gas liquid separation of both of the oxygen-containing gas humidified by the humidifier and a fuel exhaust gas containing liquid water guided from the fuel exhaust gas inlet channel, and an outlet channel configured to discharge the oxygen-containing gas and the fuel exhaust gas after gas liquid separation from the separator body and wherein a specific gravity of the fuel exhaust gas flowing through the outlet channel is lighter than a specific gravity of the oxygen-containing gas, and the outlet channel includes a stirring booster having a first point and a second point positioned downstream of the first point, and the second point is positioned ahead of the first point in a gravity direction.

According to another aspect of the present invention, a fuel cell system is provided. The fuel cell system includes a fuel cell configured to generate electricity by an electrochemical reaction of a fuel gas and an oxygen-containing gas, an oxygen-containing gas inlet channel configured to supply the oxygen-containing gas to the fuel cell, a humidifier provided in the oxygen-containing gas inlet channel, a gas liquid separator provided downstream of the humidifier in the oxygen-containing gas inlet channel, and a fuel exhaust gas inlet channel configured to guide a fuel exhaust gas containing liquid water discharged from the fuel cell to the gas liquid separator, wherein the gas liquid separator includes a separator body configured to perform gas liquid separation of both of the oxygen-containing gas humidified by the humidifier and a fuel exhaust gas containing liquid water guided from the fuel exhaust gas inlet channel, and a fuel exhaust gas inlet configured to supply the fuel exhaust gas containing liquid water guided from the fuel exhaust gas inlet channel, into the separator body, and wherein a fuel exhaust gas separation wall is provided in the separator body in a manner that the fuel exhaust gas separation wall faces an opening of the fuel exhaust gas inlet.

According to an aspect of the present invention, the gas liquid separator performs gas liquid separation of both of the oxygen-containing gas discharged from the humidifier and the fuel exhaust gas containing the liquid water discharged from the fuel cell. Therefore, it is possible to suppress entry of the excessive liquid water from the oxygen-containing gas inlet channel into the fuel cell. Further, when the oxygen-containing gas flows from the first point to the second point which is ahead of the first point in the gravity direction in the stirring booster, the fuel exhaust gas which has the specific gravity lighter than that of the oxygen-containing gas tends to flow upward. Therefore, it is possible to efficiently stir the oxygen-containing gas and the fuel exhaust gas by the specific gravity difference in the stirring booster. Accordingly, since it is possible to induce chemical reaction of the fuel exhaust gas and the oxygen-containing gas by the cathode catalyst of the fuel cell, it is possible to warm up the fuel cell rapidly, and suppress the fuel gas concentration in the exhaust gas.

According to another aspect of the present invention, the gas liquid separator performs gas liquid separation of both of the oxygen-containing gas discharged from the humidifier and the fuel exhaust gas containing the liquid water discharged from the fuel cell. Further, since the fuel exhaust gas containing the liquid water guided from the fuel exhaust gas inlet channel collides with the fuel exhaust gas separation wall, it is possible to separate the liquid water from the fuel exhaust gas utilizing a relatively larger inertial force of liquid (in view of the specific gravity difference between gas and liquid). Therefore, it is possible to suppress entry of excessive water from an oxygen-containing gas inlet channel into a fuel cell. Further, since the fuel exhaust gas discharged from the fuel exhaust gas inlet can be brought into collision with the fuel exhaust gas separation wall, it is possible to produce the turbulent flow of the fuel exhaust gas. Therefore, it is possible to efficiently stir the fuel exhaust gas and the oxygen-containing gas in the separator body. Accordingly, since it is possible to effectively induce chemical reaction of the fuel exhaust gas and the oxygen-containing gas at the cathode catalyst of the fuel cell, it is possible to rapidly warm up the fuel cell, and suppress the fuel gas concentration in the exhaust gas.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell system according to the present invention will be described with reference to the accompanying drawings.

Figure 1:
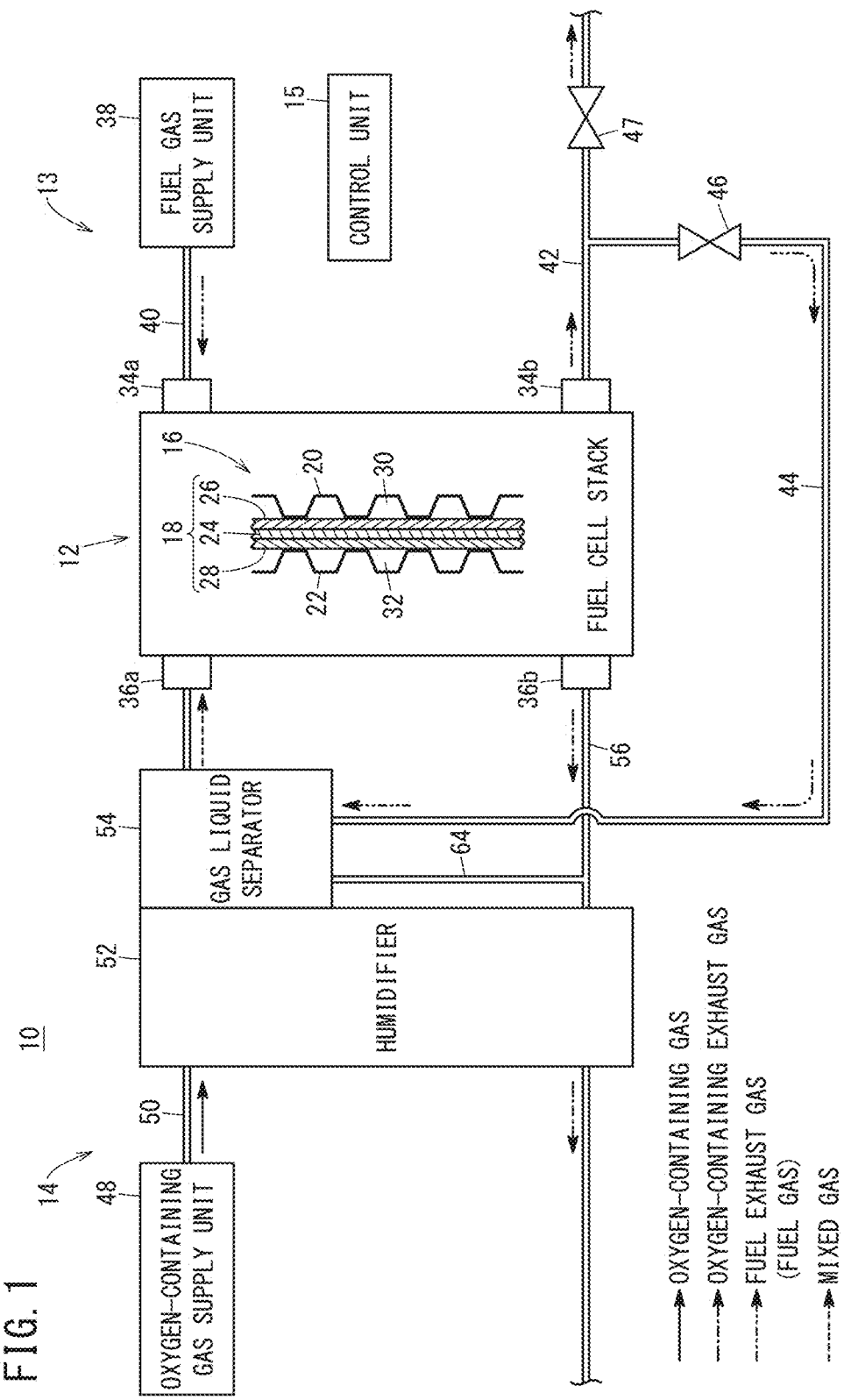
FIG. 1 is a diagram schematically showing a fuel cell system according to an embodiment of the present invention.

A fuel cell system 10 shown in FIG. 1 is, e.g., mounted in a fuel cell vehicle (not shown) such as a fuel cell electric automobile. However, it should be noted that the fuel cell system 10 may be mounted in any of various moving objects other than the fuel cell vehicle, or the fuel cell system 10 may be used in stationary applications.

The fuel cell system 10 includes a fuel cell stack 12 as a fuel cell, a fuel gas supply apparatus 13, an oxygen-containing gas supply apparatus 14, and a control unit 15. Though not shown, the fuel cell system 10 further includes a coolant supply apparatus for cooling the fuel cell stack 12, and a battery, etc.

The fuel cell stack 12 generates electricity by electrochemical reactions of a fuel gas (e.g., a hydrogen gas) and an oxygen-containing gas (e.g., the air). The fuel cell stack 12 includes a plurality of power generation cells 16 stacked together in a horizontal direction. The power generation cell 16 is formed by sandwiching a membrane electrode assembly 18 between a first separator 20 and a second separator 22. The first separator 20 and the second separator 22 are metal separators or carbon separators.

The membrane electrode assembly 18 includes a solid polymer electrolyte membrane 24, and an anode 26 and a cathode 28 provided on both surfaces of the solid polymer electrolyte membrane 24. For example, the solid polymer electrolyte membrane 24 is a thin membrane of perfluorosulfonic acid containing water. A fluorine based electrolyte may be used as the solid polymer electrolyte membrane 24. Alternatively, an HC (hydrocarbon) based electrolyte may be used as the solid polymer electrolyte membrane 24.

A fuel gas flow field 30 for guiding a fuel gas to the anode 26 is provided between the first separator 20 and the membrane electrode assembly 18. An oxygen-containing gas flow field 32 for guiding an oxygen-containing gas to the cathode 28 is provided between the second separator 22 and the membrane electrode assembly 18.

A fuel gas inlet 34a, a fuel gas outlet 34b, an oxygen-containing gas inlet 36a, and an oxygen-containing gas outlet 36b are provided in the fuel cell stack 12. The fuel gas inlet 34a extends through each of the power generation cells 16 in the stacking direction, and the fuel gas inlet 34a is connected to the supply side of the fuel gas flow field 30. The fuel gas outlet 34b extends through each of the power generation cells 16 in the stacking direction, and the fuel gas outlet 34b is connected to the discharge side of the fuel gas flow field 30. The fuel gas flow field 30, the fuel gas inlet 34a, and the fuel gas outlet 34b form an anode channel.

The oxygen-containing gas inlet 36a extends through each of the power generation cells 16 in the stacking direction, and the oxygen-containing gas inlet 36a is connected to the supply side of the oxygen-containing gas flow field 32. The oxygen-containing gas outlet 36b extends through each of the power generation cells 16 in the stacking direction, and the oxygen-containing gas outlet 36b is connected to the discharge side of the oxygen-containing gas flow field 32. The oxygen-containing gas flow field 32, the oxygen-containing gas inlet 36a, and the oxygen-containing gas outlet 36b form a cathode channel.

The fuel gas supply apparatus 13 supplies a fuel gas to the fuel cell stack 12. The fuel gas supply apparatus 13 includes a fuel gas supply unit 38, and a fuel gas inlet channel 40 for guiding the fuel gas supplied from the fuel gas supply unit 38 to the fuel gas inlet 34a. The fuel gas supply unit 38 includes a fuel gas tank (hydrogen gas tank) (not shown), etc. for storing a high pressure hydrogen (high pressure hydrogen).

A fuel gas discharge channel 42 is coupled to the fuel gas outlet 34b of the fuel cell stack 12. After at least some of the fuel gas is consumed at the anode 26, the fuel gas is discharged as a fuel exhaust gas from the fuel cell stack 12 through the fuel gas discharge channel 42.

A fuel exhaust gas inlet channel 44 is coupled to the fuel gas discharge channel 42. The fuel exhaust gas inlet channel 44 guides the fuel exhaust gas and liquid water to a gas liquid separator 54 of the oxygen-containing gas supply apparatus 14. An open/close valve 46 is provided in the fuel exhaust gas inlet channel 44. The open/close valve 46 is capable of switching between the open state in which the fuel gas discharge channel 42 and the fuel exhaust gas inlet channel 44 are connected together, and the closed state in which the fuel gas discharge channel 42 and the fuel exhaust gas inlet channel 44 are disconnected from each other.

An open/close valve 47 is provided downstream of a position of the fuel gas discharge channel 42 coupled to the fuel exhaust gas inlet channel 44. The open/close valve 47 opens and closes the fuel gas discharge channel 42. The fuel exhaust gas guided to a position of the fuel gas discharge channel 42 downstream of the open/close valve 47 may be supplied into the fuel gas supply unit 38 and circulated into the fuel cell stack 12, or may be diluted by an oxygen-containing exhaust gas and discharged to the atmospheric air.

The oxygen-containing gas supply apparatus 14 supplies the oxygen-containing gas to the fuel cell stack 12. The oxygen-containing gas supply apparatus 14 includes an oxygen-containing gas supply unit 48, and an oxygen-containing gas inlet channel 50 for guiding the oxygen-containing gas supplied from the oxygen-containing gas supply unit 48 to the oxygen-containing gas inlet 36a. As the oxygen-containing gas supply unit 48, for example, an air pump for compressing the atmospheric air, and supplying the compressed air is used.

A humidifier 52 and the gas liquid separator 54 are provided in the oxygen-containing gas inlet channel 50. The humidifier 52 exchanges the liquid water and the heat between the oxygen-containing gas (supplied air) and the oxygen-containing exhaust gas (discharged air). Stated otherwise, the humidifier 52 humidifies, and heats the oxygen-containing gas by the oxygen-containing exhaust gas. The gas liquid separator 54 is provided downstream of the humidifier 52 in the oxygen-containing gas inlet channel 50. The gas liquid separator 54 performs gas liquid separation of both of the oxygen-containing gas humidified by the humidifier 52 and the fuel exhaust gas containing the liquid water guided from the fuel exhaust gas inlet channel 44. The gas liquid separator 54 will be described later in detail.

An oxygen-containing gas discharge channel 56 is coupled to the oxygen-containing gas outlet 36b of the fuel cell stack 12. After at least some of the oxygen-containing gas is consumed at the cathode 28, the oxygen-containing gas discharge channel 56 discharges the oxygen-containing gas as the oxygen-containing exhaust gas into the atmospheric air through the humidifier 52.

Figure 2:
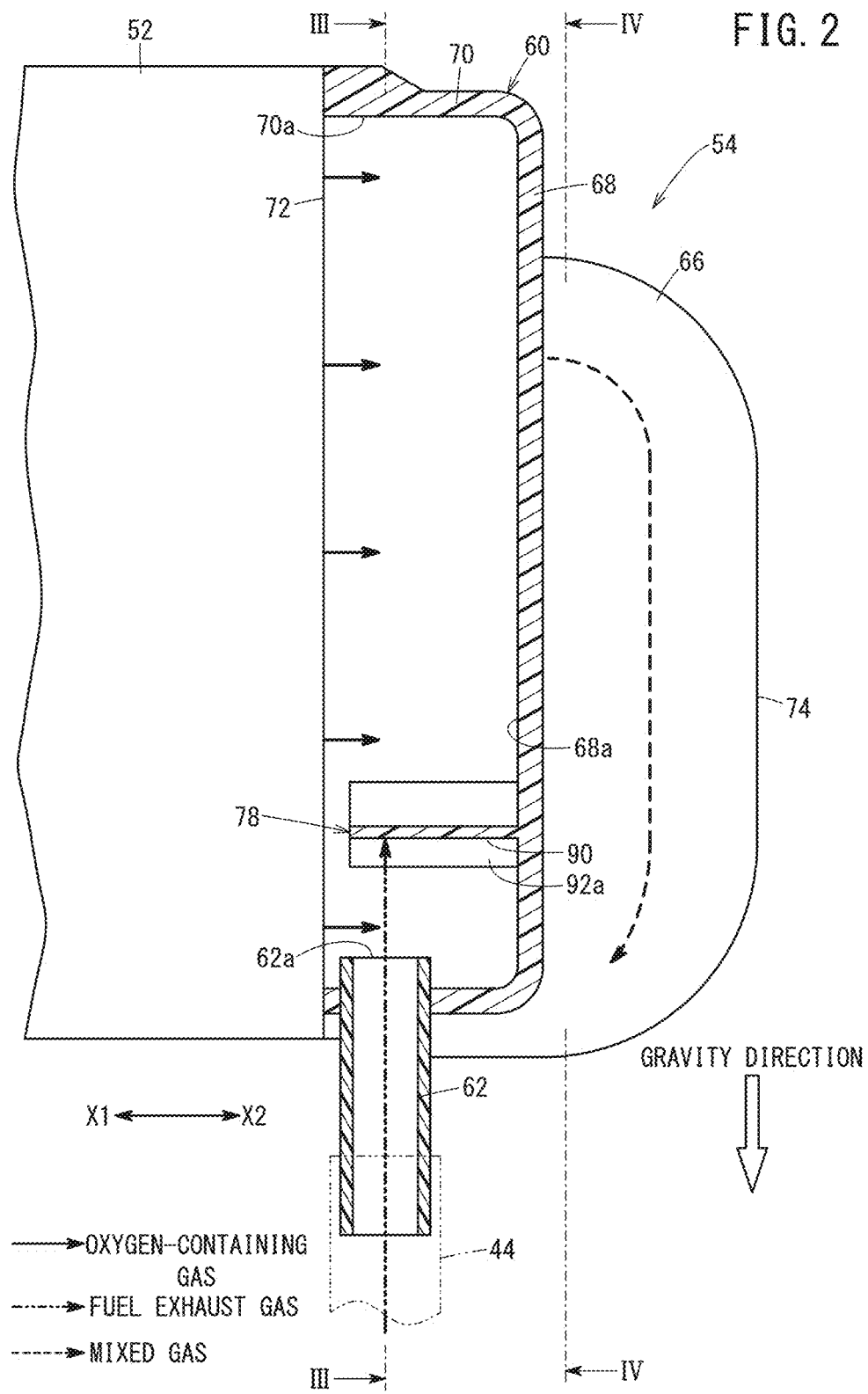
FIG. 2 is a vertical cross sectional view with partial omission, showing a gas liquid separator provided in a humidifier.
Figure 3:
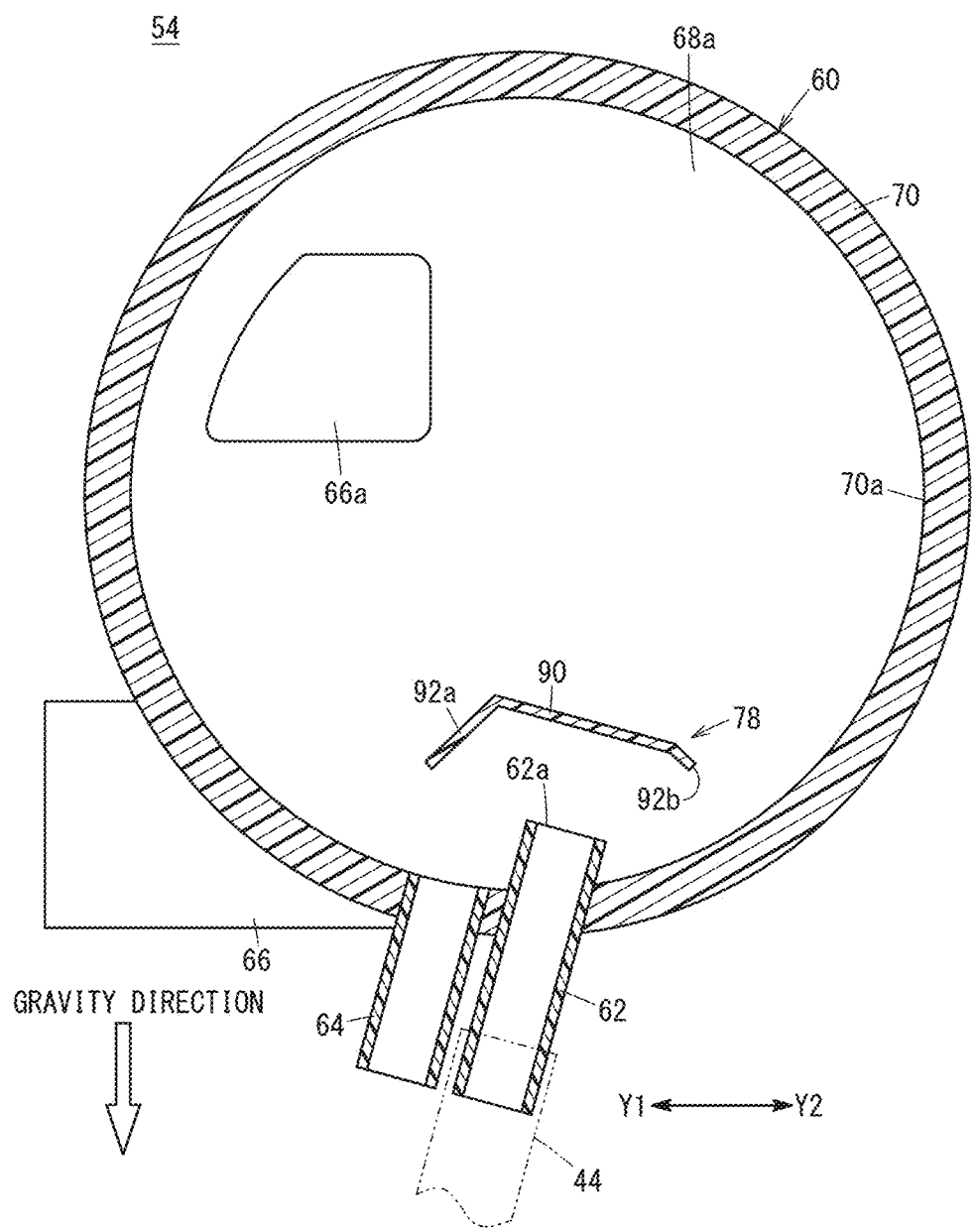
FIG. 3 is a lateral cross sectional view taken along a line III-III in FIG. 2.

As shown in FIGS. 2 and 3, the gas liquid separator 54 is provided integrally with the humidifier 52. The gas liquid separator 54 includes a separator body 60, a fuel exhaust gas inlet 62, a water drainage part 64, and an outlet channel 66. The vertical cross section of the separator body 60 has a substantially U-shape. That is, the separator body 60 includes a proximal part 68 having a separation surface 68a extending in a substantially vertical direction, and a circumferential wall 70 protruding from the proximal part 68 toward the humidifier 52 (in the direction indicated by an arrow X1) in a manner that the circumferential wall 70 surrounds the separation surface 68a.

The proximal part 68 extends in a flat plate shape. The circumferential wall 70 has an annular shape, and the circumferential wall 70 is provided in an outer marginal portion of the proximal part 68. An oxygen-containing gas inlet port 72 is formed at a protruding end of the circumferential wall 70, for supplying the oxygen-containing gas humidified in the humidifier 52 into the separator body 60. The oxygen-containing gas inlet port 72 is oriented in the direction (indicated by the arrow X1) perpendicular to the separation surface 68a, to face the separation surface 68a. The circumferential wall 70 has an inner surface 70a extending in an annular shape.

The fuel exhaust gas inlet 62 allows the fuel exhaust gas containing the liquid water guided from the fuel exhaust gas inlet channel 44 to be supplied into the separator body 60. Stated otherwise, the fuel exhaust gas inlet 62 is provided below the separator body 60 in a manner that the fuel exhaust gas containing the liquid water flows upward from the fuel exhaust gas inlet 62. The fuel exhaust gas inlet 62 has a tubular shape.

The upper end of the fuel exhaust gas inlet 62 protrudes into the separator body 60. The fuel exhaust gas inlet channel 44 is coupled to a lower end of the fuel exhaust gas inlet 62. An opening 62a at an upper end of the fuel exhaust gas inlet 62 is oriented upward (obliquely upward). That is, the oxygen-containing gas inlet port 72 is oriented in the direction (indicated by the arrow X1) intersecting with a direction in which the opening 62a of the fuel exhaust gas inlet 62 is oriented (see FIG. 2).

As shown in FIG. 3, the water drainage part 64 discharges the liquid water W (see FIG. 6) in the separator body 60 to the outside. Specifically, the water drainage part 64 is coupled to the oxygen-containing gas discharge channel 56 (see FIG. 1). The water drainage part 64 has a tubular shape, and the water drainage part 64 is provided at a lower position (lowermost position) of the circumferential wall 70. In an example of FIG. 3, the water drainage part 64 is provided adjacent to the fuel exhaust gas inlet 62.

An upper end surface of the water drainage part 64 is continuous with the inner surface 70a of the circumferential wall 70. That is, the water drainage part 64 does not protrude into the separator body 60.

Figure 5:
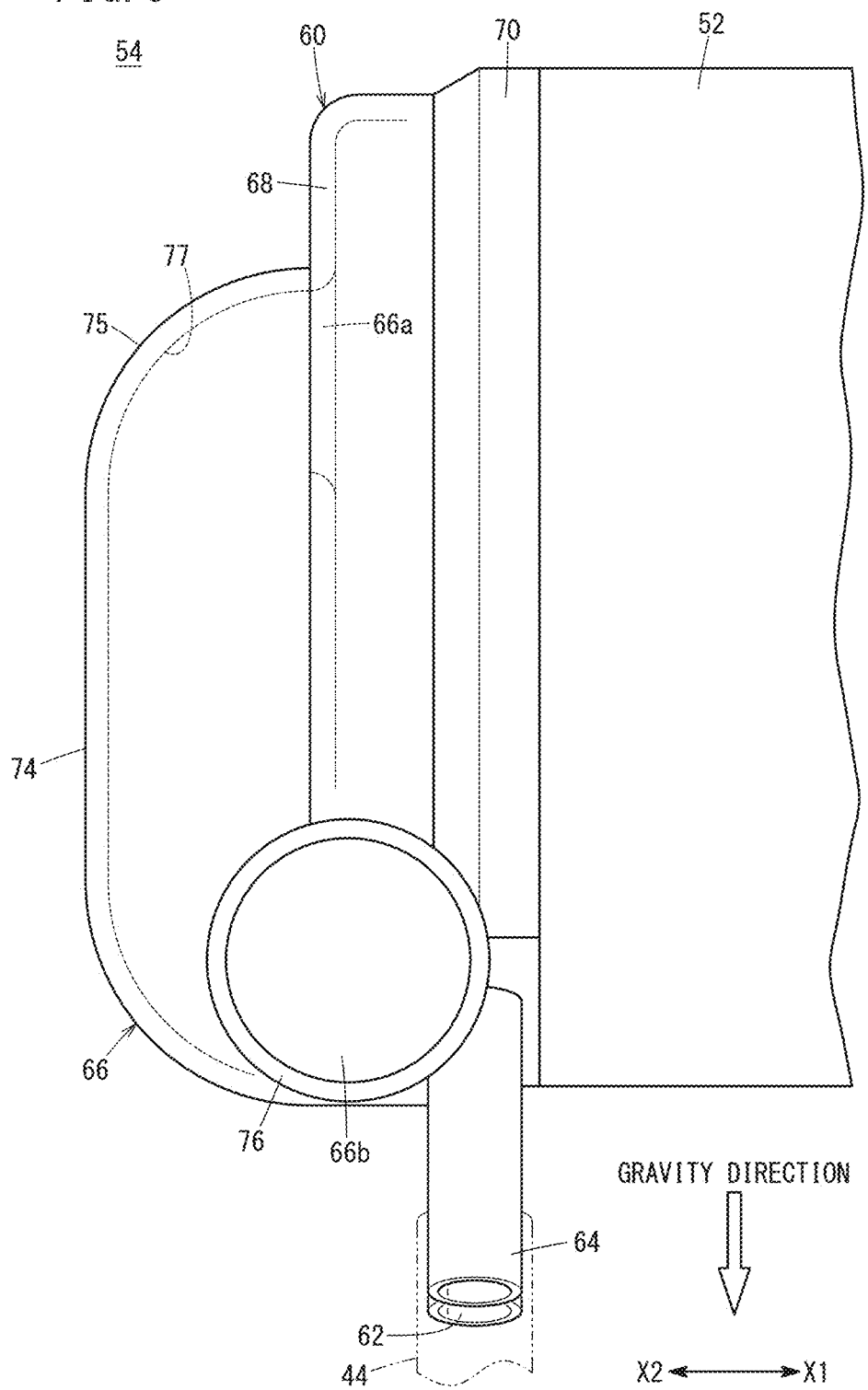
FIG. 5 is a side view showing a humidifier and the gas liquid separator.

In FIGS. 2 and 5, the outlet channel 66 discharges the oxygen-containing gas and the fuel exhaust gas from the separator body 60. Specifically, the outlet channel 66 guides the gas after gas liquid separation (mixed gas of the oxygen-containing gas and the fuel exhaust gas) toward the downstream side of the gas liquid separator 54 in the oxygen-containing gas inlet channel 50. The outlet channel 66 has a tubular shape (cylindrical shape), and the outlet channel 66 is provided on a side of the proximal part 68 (in a direction indicated by an arrow X2) opposite to the humidifier 52.

Figure 4:
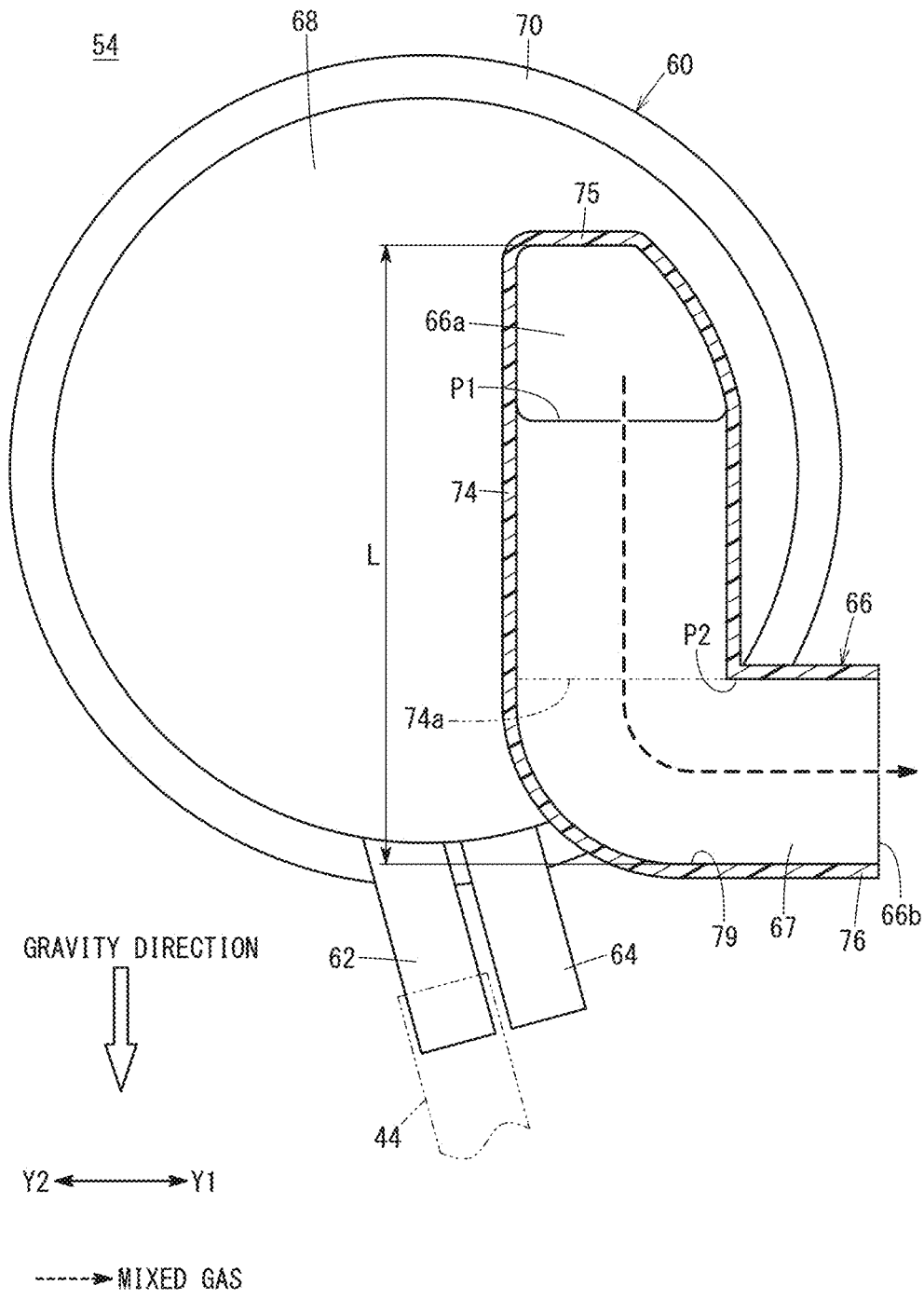
FIG. 4 is a cross sectional view taken along a line IV-IV in FIG. 2.

As shown in FIGS. 3 and 4, an outlet port 66a as one of openings of the outlet channel 66 is opened to the separation surface 68a. The outlet port 66a is positioned above the center of the separation surface 68a in the vertical direction, and on one side (in a direction indicated by an arrow Y1) shifted from the center in the left-right direction. The outlet port 66a connects an inner hole 67 of the outlet channel 66 and the inside of the separator body 60. Another opening 66b of the outlet channel 66 is oriented in the horizontal direction (indicated by the arrow Y1).

As shown in FIGS. 4 and 5, the outlet channel 66 includes a stirring booster 74 having a first point P1 and a second point P2 positioned downstream of the first point P1, a coupling part 75 provided at an upper end of the stirring booster 74, and an extension channel 76 provided at a lower end of the stirring booster 74. The specific gravity of the fuel exhaust gas flowing through the outlet channel 66 is lighter than the specific gravity of the oxygen-containing gas.

The stirring booster 74 extends straight in the gravity direction (vertical direction). In the embodiment of the present invention, the first point P1 is positioned at an upper end of the stirring booster 74, (border with the coupling part 75), and the second point P2 is positioned at a lower end the stirring booster 74 (border with the extension channel 76). The stirring booster 74 has a rectangular annular shape. It should be noted that the stirring booster 74 may have an annular shape or a polygonal shape (other than the rectangular annular shape).

The coupling part 75 couples an upper end of the stirring booster 74 and a portion above the center of the separator body 60 (proximal part 68) in the vertical direction. A curved surface 77 is formed in an inner surface of the coupling part 75. The curved surface 77 faces the outlet port 66a (see FIG. 5). The curved surface 77 guides the mixed gas guided in the direction indicated by the arrow X1 downward.

In FIG. 4, the extension channel 76 extends from the lower end of the stirring booster 74 in a direction (indicated by the arrow Y1) substantially perpendicular to the direction in which the stirring booster 74 extends. An inner surface of the extension channel 76 includes a flat surface 79. The flat surface 79 faces an opening 74a at the lower end of the stirring booster 74. The flat surface 79 extends in a substantially horizontal direction. The straight distance L from the upper end of the inner surface of the coupling part 75 to the flat surface 79 is smaller than the inner diameter of the circumferential wall 70.

As shown in FIGS. 2 and 3, a plate shaped fuel exhaust gas separation wall 78 is provided in the separator body 60 in a manner that the fuel exhaust gas separation wall 78 faces the opening 62a of the fuel exhaust gas inlet 62. That is, the opening 62a of the fuel exhaust gas inlet 62 is positioned below the fuel exhaust gas separation wall 78.

In FIG. 3, the fuel exhaust gas separation wall 78 is positioned below the center of the separation surface 68a in the vertical direction. That is, the fuel exhaust gas separation wall 78 is spaced from the outlet port 66a by a predetermined distance. The fuel exhaust gas separation wall 78 includes a flat shaped separation wall body 90 facing the opening 62a of the fuel exhaust gas inlet 62, and protrusions 92a, 92b protruding downward from the separation wall body 90.

The separation wall body 90 extends in the direction indicated by the arrow Y2 with slight downward inclination. The protrusions 92a, 92b guide the liquid water W attached to the separator body 60. The protrusion 92a extends downward from the end of the separation wall body 90 in the direction indicated by the arrow Y1 (end closer to the outlet port 66a), and inclined in the direction indicated by the arrow Y1. The protrusion 92b extends downward from the end of the separation wall body 90 indicated by the arrow Y2 (end remoter from the outlet port 66a), and inclined in the direction indicated by the arrow Y2. The protruding length of the protrusion 92b is shorter than the protruding length of the protrusion 92a.

The control unit 15 controls the entire fuel cell system 10. The control unit 15 controls opening/closing operation of the open/close valves 46, 47.

Next, operation of the fuel cell system 10 at the time of starting its operation will be described below. It should be noted that, at the time of starting operation of the fuel cell system 10, the control unit 15 opens the open/close valve 46, and closes the open/close valve 47.

As shown in FIG. 1, at the time of starting operation of the fuel cell system 10, in the fuel gas supply apparatus 13, the fuel gas is supplied to the fuel gas inlet 34a from the fuel gas supply unit 38 to the fuel gas inlet channel 40. The fuel gas supplied to the fuel gas inlet 34a flows into the fuel gas flow field 30, and moves along the fuel gas flow field 30. Thus, the fuel gas is supplied to the anode 26 of the membrane electrode assembly 18.

In the oxygen-containing gas supply apparatus 14, the oxygen-containing gas flows from the oxygen-containing gas supply unit 48 into the oxygen-containing gas inlet channel 50. After the oxygen-containing gas which flows into the oxygen-containing gas inlet channel 50 is humidified by the humidifier 52, the excessive liquid water is removed by the gas liquid separator 54, and the oxygen-containing gas is supplied to the oxygen-containing gas inlet 36a. The oxygen-containing gas supplied to the oxygen-containing gas inlet 36a flows into the oxygen-containing gas flow field 32, and the oxygen-containing gas moves along the oxygen-containing gas flow field 32, and the oxygen-containing gas is supplied to the cathode 28 of the membrane electrode assembly 18.

Thus, in each of the membrane electrode assemblies 18, the fuel gas supplied to the anode 26 and the oxygen in the oxygen-containing gas supplied to the cathode 28 are partially consumed in the electrochemical reactions to generate electricity.

Then, after some of the fuel gas supplied to the anode 26 is consumed, the fuel gas containing the liquid water is discharged as the fuel exhaust gas from the fuel gas outlet 34b into the fuel gas discharge channel 42. At this time, since the open/close valve 46 is opened, and the open/close valve 47 is closed, the fuel exhaust gas containing the liquid water in the fuel gas discharge channel 42 flows into the gas liquid separator 54 through the fuel exhaust gas inlet channel 44.

After some of the oxygen-containing gas supplied to the cathode 28 is consumed, the oxygen-containing gas is discharged as the oxygen-containing exhaust gas from the oxygen-containing gas outlet 36b into the humidifier 52 through the oxygen-containing gas discharge channel 56. In the humidifier 52, the heat and the liquid water in the oxygen-containing exhaust gas are exchanged with the oxygen-containing gas guided from the oxygen-containing gas inlet channel 50. The oxygen-containing exhaust gas which flowed through the humidifier 52 is discharged to the outside.

In the gas liquid separator 54, gas liquid separation of the oxygen-containing gas humidified by the humidifier 52 and the fuel exhaust gas containing the liquid water is performed, and then, the oxygen-containing gas and the fuel exhaust gas are mixed together. After the gas liquid separation, the mixed gas discharged from the gas liquid separator 54 is guided from the oxygen-containing gas inlet 36a into the cathode 28. Thus, since heat is produced in the reaction of the mixed gas induced by the cathode catalyst, the fuel cell stack 12 is warmed up rapidly. Thus, improvement in the performance of starting operation of the fuel cell system 10 at low temperature is achieved. Further, in the state where the fuel exhaust gas is mixed with the oxygen-containing gas, the fuel exhaust gas is used at the cathode catalyst of the fuel cell stack 12. Therefore, the concentration of the fuel exhaust gas discharged into the atmospheric air is reduced sufficiently.

Next, operation of the gas liquid separator 54 will be described.

Figure 6:
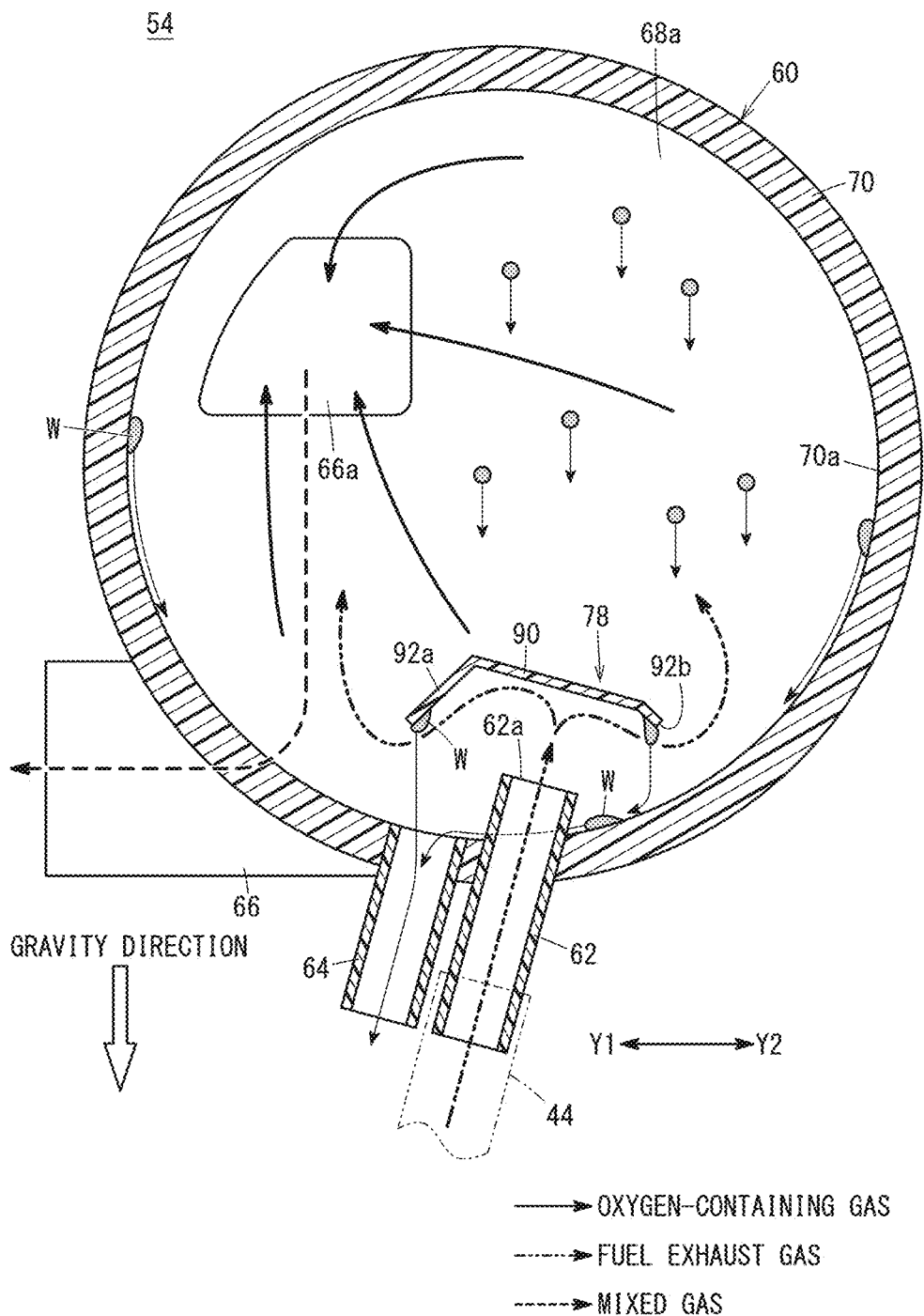
FIG. 6 is a view showing the flow of a fuel exhaust gas and a mixed gas, and the flow of liquid water.

As shown in FIG. 2, the oxygen-containing gas humidified by the humidifier 52 flows from the oxygen-containing gas inlet port 72 into the separator body 60, and the oxygen-containing gas collides with the separation surface 68a. At this time, since the inertial force of liquid is relatively larger (in view of the specific gravity difference between gas and liquid), the liquid water in the oxygen-containing gas is attached to the separation surface 68a. In FIG. 6, the liquid water W attached to the separation surface 68a flows downward along the separation surface 68a, and the liquid water W is discharged from the water drainage part 64 to the outside. It should be noted that, the liquid water W (condensed water) attached to the inner surface 70a of the circumferential wall 70 flows downward along the inner surface 70a of the circumferential wall 70, and the liquid water W is discharged from the water drainage part 64 to the outside.

The fuel exhaust gas containing the liquid water guided from the fuel exhaust gas inlet 62 collides with the separation wall body 90. When the fuel exhaust gas collides with the separation wall body 90, the liquid water in the fuel exhaust gas is attached to the separation wall body 90 by a relatively large inertial force of liquid. The liquid water W attached to the separation wall body 90 is guided downward by the protrusions 92a, 92b, and is discharged to the outside through the water drainage part 64.

After the liquid water is separated from the oxygen-containing gas by the separation surface 68a, the oxygen-containing gas flows inside the separator body 60 toward the outlet port 66a. At this time, the flow rate of the oxygen-containing gas is decreased as it gets farther from the outlet port 66a. Therefore, the area adjacent to the fuel exhaust gas separation wall 78 positioned below the center of the separation surface 68a in the vertical direction is an area where the flow rate of the oxygen-containing gas is low (low flow rate area).

After the liquid water is separated from the fuel exhaust gas by the separation wall body 90, the fuel exhaust gas flows along the lower surface of the separator body 60 separately in the direction indicated by the arrow Y1 and the direction indicated by the arrow Y2. After the fuel exhaust gas flows in the direction indicated by the arrow Y1, the fuel exhaust gas flows downward along the protrusion 92a. Thereafter, the fuel exhaust gas flows through the space between the protruding end of the protrusion 92a and the inner surface 70a of the circumferential wall 70, and the fuel exhaust gas is separated (peeled off) from the fuel exhaust gas separation wall 78. After the fuel exhaust gas flows in the direction indicated by the arrow Y2, the fuel exhaust gas flows downward along the protrusion 92b.

Thereafter, the fuel exhaust gas flows through the space between the protruding end of the protrusion 92b and the inner surface 70a of the circumferential wall 70, and the fuel exhaust gas is separated (peeled off) from the fuel exhaust gas separation wall 78. That is, a turbulent flow is generated when the fuel exhaust gas collides with the fuel exhaust gas separation wall 78.

The fuel exhaust gas separated from the fuel exhaust gas separation wall 78 is stirred with the oxygen-containing gas in a wide range, in the low flow rate area of the oxygen-containing gas inside the separator body 60. Then, the oxygen-containing gas and the fuel exhaust gas are mixed together, and guided as a mixed gas to the outlet port 66a.

Figure 7:
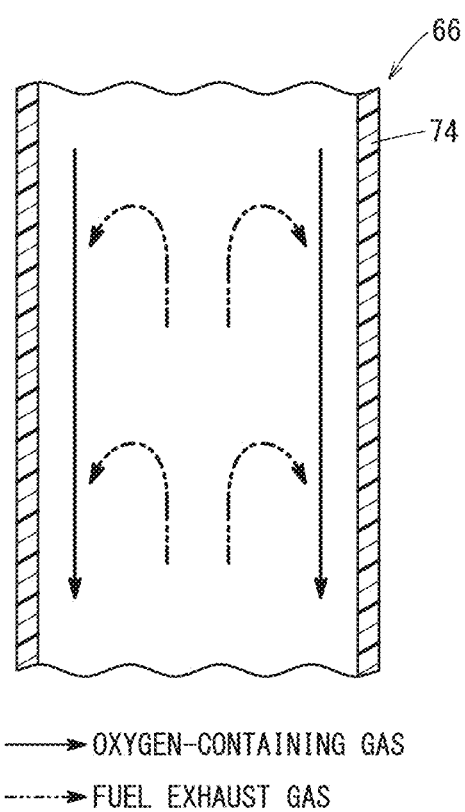
FIG. 7 is a view showing the flow of the oxygen-containing gas and the fuel exhaust gas in a stirring booster.

As shown in FIGS. 4 and 6, the mixed gas supplied from the outlet port 66a is guided to the fuel cell stack 12 through the inner hole 67 of the outlet channel 66. At this time, the mixed gas flows downward in the stirring booster 74. Specifically, in FIG. 7, in the stirring booster 74, the oxygen-containing gas in the mixed gas tends to flow downward, and the fuel exhaust gas in the mixed gas having the specific gravity lower than that of the oxygen-containing gas tends to flow upward. Therefore, by downward flow of the oxygen-containing gas, the fuel exhaust gas and the oxygen-containing gas in the mixed gas are stirred uniformly.

Then, the mixed gas which flows through the stirring booster 74 collides with the flat surface 79 of the extension channel 76. At this time, since a turbulent flow is generated by the fuel exhaust gas and the oxygen-containing gas, the fuel exhaust gas and the oxygen-containing gas are stirred uniformly to a greater extent. After the mixed gas collides with the flat surface 79 and the mixed gas is stirred, the mixed gas is guided to the fuel cell stack 12 through the other opening 66b of the outlet channel 66.

The fuel cell system 10 offers the following advantages.

In the fuel cell system 10, the gas liquid separator 54 performs gas liquid separation of both of the oxygen-containing gas humidified by the humidifier 52 and the fuel exhaust gas containing the liquid water discharged from the fuel cell. Therefore, it is possible to suppress entry of the excessive liquid water W from the oxygen-containing gas inlet channel 50 into the fuel cell (fuel cell stack 12). Further, when the oxygen-containing gas flows from the first point P1 to the second point P2 of the stirring booster 74 in the direction of gravity, the fuel gas having the specific gravity lower than that of the oxygen-containing gas tends to flow upward (in the vertical direction). Therefore, in the stirring booster 74, it is possible to stir the oxygen-containing gas and the fuel exhaust gas efficiently by the specific gravity difference. Therefore, since it is possible to induce chemical reaction of the fuel exhaust gas and the oxygen-containing gas by the cathode catalyst of the fuel cell (fuel cell stack 12), it is possible to warm up the fuel cell (fuel cell stack 12) rapidly, and suppress the fuel gas concentration in the exhaust gas.

The stirring booster 74 extends in the gravity direction. In the structure, in the stirring booster 74, it is possible to stir the oxygen-containing gas and the fuel exhaust gas more efficiently by the specific gravity difference.

The outlet channel 66 includes the extension channel 76 extending from the lower end of the stirring booster 74 in a direction substantially perpendicular to a direction in which the stirring booster 74 extends. The inner surface of the extension channel 76 includes the flat surface 79 configured to face the opening 74a at the lower end of the stirring booster 74. In the structure, since the oxygen-containing gas and fuel exhaust gas which flowed through the stirring booster 74 are brought into collision with the flat surface 79, it is possible to stir the oxygen-containing gas and the fuel exhaust gas more efficiently.

The outlet channel 66 includes the coupling part 75 configured to couple the upper end of the stirring booster 74 and the portion above the center of the separator body 60 in the vertical direction, together. In the structure, the lower end of the stirring booster 74 does not protrude downward beyond the gas liquid separator 54, or protrudes downward beyond the gas liquid separator to a lesser degree. Therefore, it is possible to reduce the size of the fuel cell system 10.

The gas liquid separator 54 includes the fuel exhaust gas inlet 62 configured to supply the fuel exhaust gas containing liquid water guided from the fuel exhaust gas inlet channel 44 into the separator body 60, and the fuel exhaust gas separation wall 78 is provided in the separator body 60 in a manner that the fuel exhaust gas separation wall 78 faces the opening 62a of the fuel exhaust gas inlet 62.

In the structure, since the fuel exhaust gas discharged from the fuel exhaust gas inlet 62 can be brought into collision with the fuel exhaust gas separation wall 78, it is possible to produce the turbulent flow of the fuel exhaust gas. Therefore, it is possible to efficiently stir the fuel exhaust gas and the oxygen-containing gas in the separator body 60. Further, since the fuel exhaust gas containing the liquid water guided from the fuel exhaust gas inlet channel 44 is brought into collision with the fuel exhaust gas separation wall 78, it is possible to separate the liquid water from the fuel exhaust gas utilizing the relatively larger inertial force of liquid.

The separator body 60 has the oxygen-containing gas inlet 72 oriented in a direction intersecting with a direction in which the opening 62a of the fuel exhaust gas inlet 62 is oriented, and configured to supply the oxygen-containing gas humidified by the humidifier 52 into the separator body 60. In the structure, it becomes possible to make the direction in which the oxygen-containing gas flows from the oxygen-containing gas inlet port 72 into the separator body 60 and the direction in which the fuel exhaust gas flows from the fuel exhaust gas inlet 62 into the separator body 60 different from each other. Thus, it is possible to efficiently mix the oxygen-containing gas and the fuel exhaust gas inside the separator body 60.

The fuel exhaust gas inlet 62 is provided at a lower position of the separator body 60 in a manner that the fuel exhaust gas containing the liquid water flows upward. In the structure, it is possible to mix the oxygen-containing gas and the fuel exhaust gas inside the separator body 60 more efficiently.

The outlet port 66a connected to the inner hole 67 of the outlet channel 66 is provided in the portion above the center of the separator body 60 in the vertical direction. In the structure, it is possible to supply the fuel exhaust gas into the area (low flow rate area) where the flow rate of the oxygen-containing gas in the separator body 60 is relatively low. Thus, it is possible to efficiently stir the oxygen-containing gas and the fuel exhaust gas in the separator body 60.

The fuel exhaust gas separation wall 78 includes the flat shaped separation wall body 90 configured to face the opening 62a of the fuel exhaust gas inlet 62, and the protrusions 92a, 92b protruding downward from the separation wall body 90. In the structure, the fuel exhaust gas which collided with the separator body 60 can flow in the gravity direction by the protrusions 92a, 92b. Therefore, it is possible to stir the oxygen-containing gas and the fuel exhaust gas more efficiently.

The gas liquid separator 54 is provided integrally with the humidifier 52. In the structure, in comparison with the case where the gas liquid separator 54 is provided separately from the humidifier 52, it is possible to reduce the size of the fuel cell system 10.

The gas liquid separator 54 may be provided separately from the humidifier 52. That is, the gas liquid separator 54 only have to be provided downstream of the humidifier 52 in the oxygen-containing gas inlet channel 50.

The present invention is not limited to the case where the fuel exhaust gas inlet 62 is provided at the lower position of the circumferential wall 70. The fuel exhaust gas inlet 62 may be provided at the upper position of the circumferential wall 70, or at the center of the circumferential wall 70 in the vertical direction. The outlet port 66a may be formed at any position of the separation surface 68a. The first point P1 and the second point P2 of the stirring booster 74 can be determined freely as long as the second point P2 is positioned downstream of the first point P1. The stirring booster 74 may have any shape as long as the second point P2 is positioned ahead of the first point P1 in the gravity direction. That is, the stirring booster 74 may extend obliquely downward toward the downstream side in a direction perpendicular to the gravity direction.

The fuel cell system according to the present invention is not limited to the above described embodiment. It is a matter of course that various structures may be adopted without departing from the gist of the present invention.

What is claimed is:

1. A fuel cell system comprising:
   a fuel cell configured to generate electricity by an electrochemical reaction of a fuel gas and an oxygen-containing gas;
   an oxygen-containing gas inlet channel configured to supply the oxygen-containing gas to the fuel cell;
   a humidifier provided in the oxygen-containing gas inlet channel;
   a gas liquid separator provided downstream of the humidifier in the oxygen-containing gas inlet channel; and
   a fuel exhaust gas inlet channel configured to guide a fuel exhaust gas containing liquid water discharged from the fuel cell to the gas liquid separator,
   wherein the gas liquid separator comprises:
   a separator body configured to perform gas liquid separation of both of the oxygen-containing gas humidified by the humidifier and a fuel exhaust gas containing liquid water guided from the fuel exhaust gas inlet channel; and
   an outlet channel configured to discharge the oxygen-containing gas and the fuel exhaust gas after gas liquid separation from the separator body, and
   wherein a specific gravity of the fuel exhaust gas flowing through the outlet channel is lighter than a specific gravity of the oxygen-containing gas; and
   the outlet channel comprises a stirring booster having a first point and a second point positioned downstream of the first point;
   the second point is positioned ahead of the first point in a gravity direction, and
   the stirring booster of the outlet channel extends in the gravity direction and is in fluid communication with an extension channel that extends in a perpendicular direction to the gravity direction, and the fuel exhaust gas and the oxygen-containing gas flow through the stirring booster of the outlet channel from the first point to the extension channel along the gravity direction.

2. A fuel cell system comprising:
   a fuel cell configured to generate electricity by an electrochemical reaction of a fuel gas and an oxygen-containing gas;
   an oxygen-containing gas inlet channel configured to supply the oxygen-containing gas to the fuel cell;
   a humidifier provided in the oxygen-containing gas inlet channel;
   a gas liquid separator provided downstream of the humidifier in the oxygen-containing gas inlet channel; and
   a fuel exhaust gas inlet channel configured to guide a fuel exhaust gas containing liquid water discharged from the fuel cell to the gas liquid separator,
   wherein the gas liquid separator comprises:
   a separator body configured to perform gas liquid separation of both of the oxygen-containing gas humidified by the humidifier and a fuel exhaust gas containing liquid water guided from the fuel exhaust gas inlet channel; and
   an outlet channel configured to discharge the oxygen-containing gas and the fuel exhaust gas after gas liquid separation from the separator body, and
   wherein a specific gravity of the fuel exhaust gas flowing through the outlet channel is lighter than a specific gravity of the oxygen-containing gas; and
   the outlet channel comprises a stirring booster having a first point and a second point positioned downstream of the first point; and
   the second point is positioned ahead of the first point in a gravity direction,
   wherein the outlet channel includes an extension channel extending from a lower end of the stirring booster in a direction substantially perpendicular to a direction in which the stirring booster extends; and wherein an inner surface of the extension channel includes a flat surface configured to face an opening at the lower end of the stirring booster.

3. The fuel cell system according to claim 1, wherein the outlet channel includes a coupling part configured to couple an upper end of the stirring booster and a portion above the center of the separator body in a vertical direction, together.

4. The fuel cell system according to claim 1, wherein the gas liquid separator includes a fuel exhaust gas inlet configured to supply a fuel exhaust gas containing liquid water guided from the fuel exhaust gas inlet channel into the separator body; and a fuel exhaust gas separation wall is provided in the separator body in a manner that the fuel exhaust gas separation wall faces an opening of the fuel exhaust gas inlet.

5. The fuel cell system according to claim 4, wherein the separator body has an oxygen-containing gas inlet oriented in a direction intersecting with a direction in which the opening of the fuel exhaust gas inlet is oriented and configured to supply the oxygen-containing gas humidified by the humidifier into the separator body.

6. The fuel cell system according to claim 5, wherein the fuel exhaust gas inlet is provided at a lower position of the separator body in a manner that the fuel exhaust gas containing the liquid water flows upward.

7. The fuel cell system according to claim 6, wherein an outlet port connected to an inner hole of the outlet channel is provided in a portion above the center of the separator body in a vertical direction.

8. The fuel cell system according to claim 6, wherein the fuel exhaust gas separation wall comprises:

a flat shaped separation wall body configured to face an opening of the fuel exhaust gas inlet; and a protrusion protruding downward from the separation wall body.

9. The fuel cell system according to claim 1, wherein the gas liquid separator is provided integrally with the humidifier.

10. The fuel cell system according to claim 3, wherein an inner surface of the coupling part includes a curved surface configured to guide the oxygen-containing gas and the fuel exhaust gas guided from inside of the separator body, in the gravity direction.

* * * * *